United States Patent
Kim et al.

(10) Patent No.: US 11,725,671 B2
(45) Date of Patent: Aug. 15, 2023

(54) FAN MOTOR

(71) Applicant: LG Electronics Inc., Seoul (KR)

(72) Inventors: Sunggi Kim, Seoul (KR); Byungjik Kim, Seoul (KR); Eunji Hwang, Seoul (KR); Jisu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 74 days.

(21) Appl. No.: 17/370,557

(22) Filed: Jul. 8, 2021

(65) Prior Publication Data

US 2022/0010811 A1 Jan. 13, 2022

(30) Foreign Application Priority Data

Jul. 9, 2020 (KR) .................. 10-2020-0084923

(51) Int. Cl.
*F04D 29/58* (2006.01)
*F04D 29/32* (2006.01)
(Continued)

(52) U.S. Cl.
CPC ........... *F04D 29/584* (2013.01); *F04D 25/06* (2013.01); *F04D 25/0606* (2013.01);
(Continued)

(58) Field of Classification Search
CPC ...... F04D 17/06; F04D 25/06; F04D 25/0606; F04D 25/082; F04D 29/5806;
(Continued)

(56) References Cited

U.S. PATENT DOCUMENTS 5,350,281 A * 9/1994 Hagshenas .......... F04D 29/5806
417/369
9,897,104 B2 2/2018 King et al.
(Continued)

FOREIGN PATENT DOCUMENTS

CN 207513901 6/2018
CN 207968200 10/2018
(Continued)

OTHER PUBLICATIONS

Office Action in Taiwanese Appln. No. 110120433, dated Dec. 1, 2021, 20 pages (with English translation).
(Continued)

*Primary Examiner* — Kenneth J Hansen
(74) *Attorney, Agent, or Firm* — Fish & Richardson P.C.

(57) ABSTRACT

A fan motor includes a housing, a rotating shaft that is rotatably disposed in the housing and extends through the housing, an impeller rotatably disposed at the rotating shaft, a first vane disposed adjacent to the impeller and configured to guide a flow of air generated by the impeller, a rotor disposed at the rotating shaft and spaced apart from the impeller in an axial direction of the rotating shaft, a stator that is disposed in the housing and surrounds the rotor, the stator and the rotor defining an air gap therebetween, and a second vane coupled to the stator and disposed downstream relative to the first vane in a flow direction of the flow of air. The second vane is in contact with at least a part of an inner surface of the housing.

17 Claims, 8 Drawing Sheets

(51) Int. Cl.
  *F04D 25/06* (2006.01)
  *H02K 9/06* (2006.01)
  *F04D 25/08* (2006.01)
  *F04D 29/44* (2006.01)

(52) U.S. Cl.
  CPC ......... *F04D 25/082* (2013.01); *F04D 29/325* (2013.01); *F04D 29/444* (2013.01); *H02K 9/06* (2013.01)

(58) Field of Classification Search
  CPC .... F04D 29/584; F04D 29/325; F04D 29/444; H02K 9/06; H02K 9/14
  See application file for complete search history.

(56) References Cited

U.S. PATENT DOCUMENTS

| | | |
|---|---|---|
| 2012/0219437 A1 | 8/2012 | Nakamura et al. |
| 2013/0171013 A1 | 7/2013 | Jang et al. |
| 2018/0172024 A1 | 6/2018 | Hayamitsu et al. |
| 2018/0180058 A1 | 6/2018 | Hayamitsu et al. |
| 2018/0335039 A1 | 11/2018 | Hayamitsu |
| 2018/0351431 A1 | 12/2018 | Kim et al. |
| 2019/0027998 A1 | 1/2019 | Takaki et al. |
| 2020/0063576 A1 | 2/2020 | Kim et al. |

FOREIGN PATENT DOCUMENTS

| | | | |
|---|---|---|---|
| EP | 2677174 | 12/2013 | |
| EP | 3354903 A1 * | 8/2018 | ............... A47L 5/24 |
| JP | 2017143737 | 8/2017 | |
| KR | 101873117 | 6/2018 | |
| KR | 20200044737 | 4/2020 | |
| TW | 201144609 | 12/2011 | |
| TW | 201915338 | 4/2019 | |
| TW | 202010944 | 3/2020 | |
| WO | WO 2019/167153 | 9/2019 | |
| WO | WO 2019/212294 | 11/2019 | |

OTHER PUBLICATIONS

Office Action in Australian Appln. No. 2021204809, dated Oct. 6, 2022, 7 pages.

* cited by examiner

FAN MOTOR

CROSS-REFERENCE TO RELATED APPLICATION

Pursuant to 35 U.S.C. § 119(a), this application claims the benefit of the earlier filing date and the right of priority to Korean Patent Application No. 10-2020-0084923, filed on Jul. 9, 2020, the contents of which are incorporated by reference herein in their entirety.

TECHNICAL FIELD

The present disclosure relates to a fan motor capable of rotating a fan at a high speed.

BACKGROUND

A motor or electric motor is an apparatus that generates a rotational force using electric energy.

For example, motors may include a housing, a stator disposed inside the housing, a rotor that is disposed inside the stator and configured to be rotated by interaction with a magnetic field produced by the stator, and a rotating shaft that is coupled to the rotor and configured to rotate together with the rotor.

A fan, such as an impeller, may be coupled to one side of the rotating shaft of the motor to generate an air current.

In some cases, the motor can be used in a home appliance such as a vacuum cleaner and a hair dryer. The motor may be coupled to a fan, and the fan may be rotated by receiving power from the motor to thereby generate an air current.

Since the vacuum cleaner or the hair dryer is held and used in one or both hands, its size and weight reduction may be related to portability and convenience of use. In addition, since a motor of the vacuum cleaner or the hair dryer may rotate at a high speed, cooling of the motor and the reliability of a bearing may be provided when the motor is rotated at the high speed.

For instance, a motor may introduce air by rotation of a fan and include a heat sink having a diameter greater than a diameter of the fan to cool a motor rotating at a high speed. In some cases, the structure of the motor may be complicated because of a separate component only for cooling of a bearing, which may make it difficult to cool a stator due to the operation of the motor.

In some cases, a motor may include a heat sink and a flow guide to cool heat generated in a bearing due to rotation of a fan. In some cases, where a stator is only cooled by an air flow, heat generated in the stator caused by a high-speed rotation of a motor may not be easily released or discharged. This may result in a decrease in motor efficiency.

A fan motor structure may be improved to reduce a decrease in motor efficiency caused by an increase in temperatures of a stator and a rotor due to a reduced heat dissipation area of a small and light fan motor rotating at a high speed of 100,000 rpm or higher.

SUMMARY

The present disclosure describes a fan motor having a simple internal structure that can reduce a decrease in flow efficiency caused by a bent flow path when air introduced into a housing flows during a high-speed rotation of the motor.

The present disclosure also describes a fan motor including a vane in contact with a stator to thereby achieve efficient cooling.

According to one aspect of the subject matter described in this application, a fan motor includes a housing, a rotating shaft that is rotatably disposed in the housing and extends through the housing, an impeller rotatably disposed at the rotating shaft, a first vane disposed adjacent to the impeller and configured to guide a flow of air generated by the impeller, a rotor disposed at the rotating shaft and spaced apart from the impeller in an axial direction of the rotating shaft, a stator that is disposed in the housing and surrounds the rotor, the stator and the rotor defining an air gap therebetween, and a second vane coupled to the stator and disposed downstream relative to the first vane in a flow direction of the flow of air. The second vane is in contact with at least a part of an inner surface of the housing.

Implementations according to this aspect can include one or more of the following features. For example, the first vane can include a first vane hub that has a cylindrical shape and a vane blade that extends along an outer surface of the first vane hub. In some examples, the vane blade can be one of a plurality of vane blades that extend along the outer surface of the first vane hub and are spaced apart from one another in a circumferential direction of the first vane hub.

In some implementations, the second vane can include a second vane hub that has a cylindrical shape and surrounds the stator, and a heat dissipation fin that protrudes from an outer surface of the second vane hub and is in contact with the inner surface of the housing, where the heat dissipation fin is configured to transfer heat to the inner surface of the housing. In some examples, the heat dissipation fin can be configured to guide the flow of air away from the impeller.

In some examples, the heat dissipation fin can be one of a plurality of heat dissipation fins that protrude from the outer surface of the second vane hub. Each of the plurality of heat dissipation fins can be inclined with respect to the axial direction at a predetermined angle such that air is introduced into the housing toward the impeller based on the impeller being driven. In some examples, the plurality of heat dissipation fins extend along the outer surface of the second vane hub and are spaced apart from one another by a predetermined interval in a circumferential direction of the second vane hub.

In some implementations, the fan motor can include a first bearing that is disposed at a first side of the rotating shaft with respect to the rotor and rotatably supports the rotating shaft, a second bearing that is disposed at a second side of the rotating shaft with respect to the rotor and rotatably supports the rotating shaft, and a first bearing housing that accommodates and supports the first bearing, that is disposed adjacent to the impeller, and that is fixed inside the housing. In some examples, the second vane can include a seating portion that protrudes toward the impeller and is coupled to the first bearing housing. In some cases, the seating portion can be one of a plurality of seating portions that are arranged along an upper end of the second vane. In some examples, the first bearing housing can be disposed downstream relative to the impeller in the flow direction.

In some implementations, the impeller can be configured to be driven to introduce air into the housing toward the second vane.

In some implementations, the first bearing housing can include a body having a cylindrical shape and a vane coupling portion that and is disposed at an outer surface of the body and extends in an up-and-down direction parallel to the axial direction. In some examples, the body can support a bottom portion of the first vane, where the body can include an impeller seating portion disposed at an upper portion thereof.

In some examples, the body can include a bearing support portion that is disposed at a central portion thereof and has a ring shape, where the bearing support portion extends in the up-and-down direction and accommodates the first bearing. In some examples, the vane coupling portion can be one of a plurality of vane coupling portions disposed along the outer surface of the body. The first bearing housing can have a plurality of holes defined between the plurality of vane coupling portions and configured to communicate air therethrough.

In some implementations, the second vane can include a seating portion that protrudes toward the impeller and is coupled to the first bearing housing, where the seating portion defines a coupling hole that receives a screw fixing the second vane to the vane coupling portion.

In some implementations, the fan motor can include a sub bearing housing coupled to a lower portion of the housing and disposed downstream relative to the second vane in the flow direction. The sub bearing housing can include a sub bearing support portion disposed at a central portion thereof, where the sub bearing support portion extends in an up-and-down direction parallel to the axial direction and accommodates the second bearing.

In some examples, the sub bearing housing can define a plurality of air outlets disposed adjacent to the sub bearing support portion and configured to discharge air an outside of the fan motor. In some examples, the stator can be disposed at an upper portion of the sub bearing housing and is fixed to the sub bearing housing by a screw.

In some implementations, air can be introduced through an air inlet based on the impeller being driven and flow toward the second vane passing through the first vane and the bearing housing, where a change of flow path can be minimized to thereby prevent or reduce a decrease in air flow efficiency.

In some implementations, where the second vane is in contact with a stator core, the heat dissipation fin can transfer heat to the housing such that heat generated in the stator can be more effectively released.

DETAILED DESCRIPTION

Figure 1:
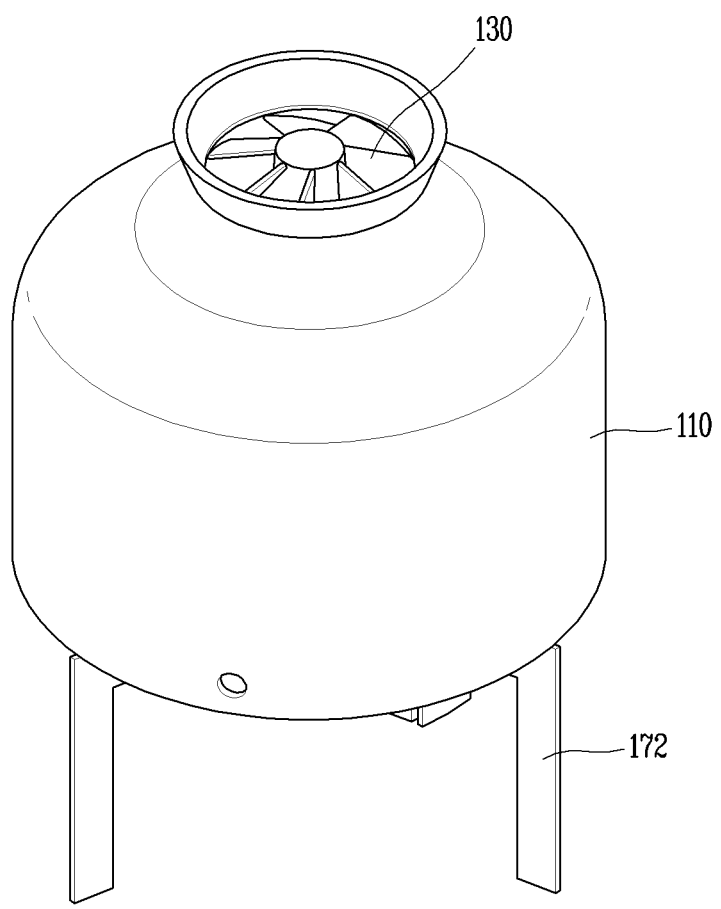
FIG. 1 is a perspective view illustrating an outer appearance of an example fan motor.

Hereinafter, one or more implementations of the present disclosure will be described in detail with reference to the accompanying drawings. The same or similar elements are designated with the same or similar reference numerals, and a redundant description has been omitted.

Figure 2:
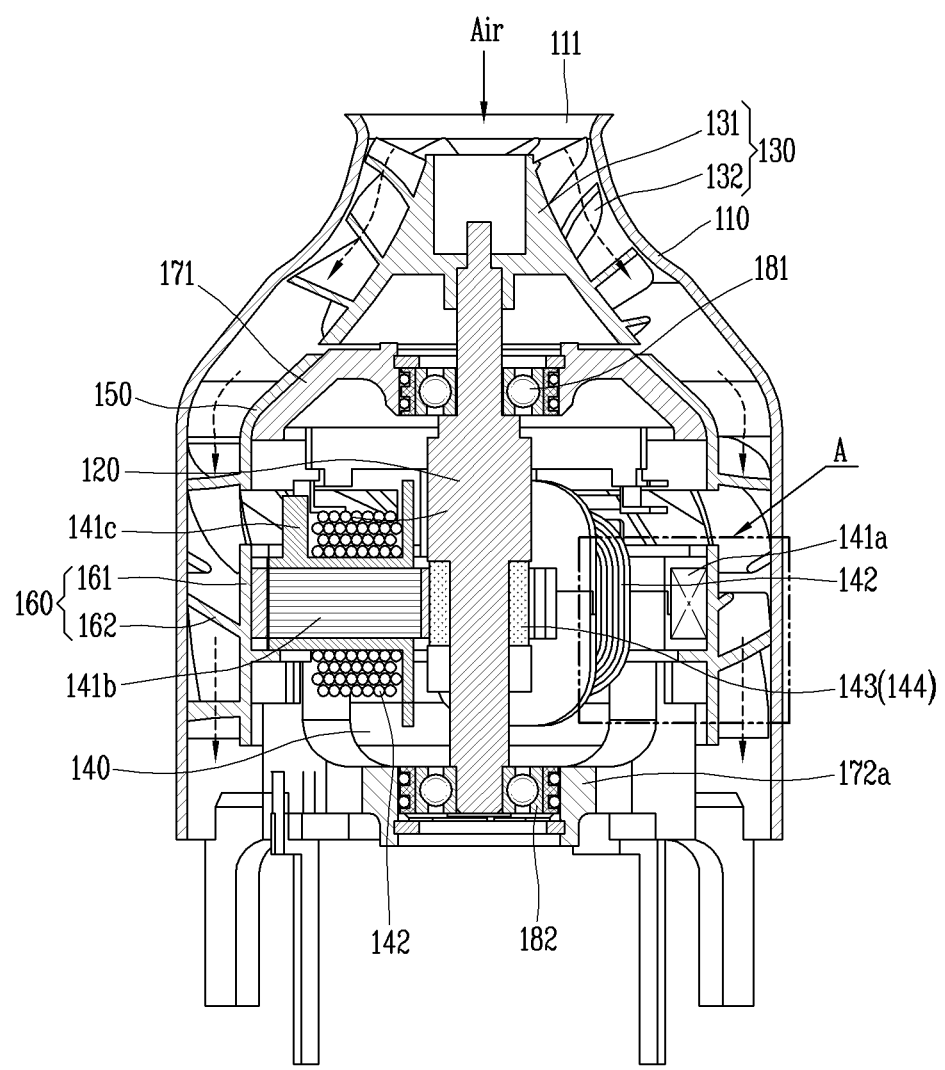
FIG. 2 is a cross-sectional view illustrating the fan motor.
Figure 3:
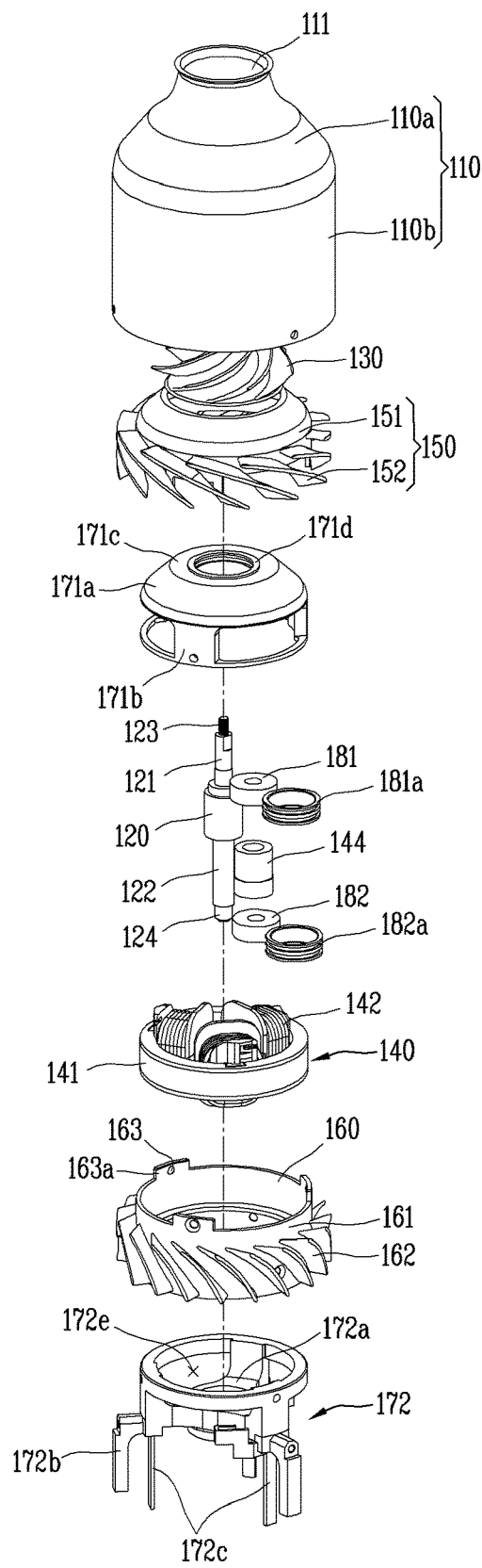
FIG. 3 is an exploded perspective view illustrating the fan motor.

FIG. 1 is a perspective view illustrating an outer appearance of an example fan motor, FIG. 2 is a cross-sectional view of the fan motor, and FIG. 3 is an exploded perspective view of the fan motor.

In some implementations, a fan motor 100 includes housing 110, a rotating (or rotational) shaft 120, an impeller 130, a rotor 144, a stator 140, a first vane 150, and a second vane 160. As described later, the fan motor 100 can further include a first bearing 181, a second bearing 182, a bearing housing 171 (a first bearing housing), and a sub bearing housing 172 (a second bearing housing).

The housing 110 defines an outer appearance of the fan motor 100. In some examples, the housing 110 can be also referred to as a shroud, but the term "housing" will be used herein.

The housing 110 can have a circular cross section, include an accommodation space therein, and serve to generate a flow of air along a longitudinal direction (an up-and-down direction or axial direction in FIG. 1). For example, the up-and-down direction can be defined based on a flow direction of air in the housing 110 which flows from an upstream side to a downstream side along the up-and-down direction. In some examples, the up-and-down direction can be defined based on a position of the fan motor 100 with a bottom of the housing 110 facing a ground as shown in FIG. 1.

Upper and lower ends of the housing 110 can be open, and the housing 110 can have a shape that is tapered toward the top.

The open upper end of the housing 110 can be provided with an air inlet 111 through which air is suctioned when the impeller 130 is driven, and the sub bearing housing 172 to be described hereinafter can be coupled to the open lower end of the housing 110 so that the introduced air is discharged through an air outlet 172e formed at the sub bearing housing 172.

The housing 110 can include an upper housing 110a and a lower housing 110b.

The upper housing 110a, which is located at an upper portion of the lower housing 110b, can have a cross-sectional area that decreases in a direction toward the air inlet 111.

The upper housing 110a can include a bottle neck portion having a tapered shape that decreases in cross-sectional area toward the top. Since the flow velocity of air increases at the bottle neck portion, speed of air suctioned through the air inlet 111 can be increased.

The rotating shaft 120, the impeller 130, the stator 140, the rotor 144, the first vane 150, the second vane 160, the first bearing 181, the second bearing 182, the bearing housing 171, and the sub bearing housing 172 can be accommodated in an accommodation space defined by the upper housing 110a and the lower housing 110b.

For example, as illustrated in FIG. 2, the impeller 130, the first vane 150, and the bearing housing 171 can be installed in the upper housing 110a, and the stator 140 and the rotor 144 can be installed in the lower housing 110b.

Air introduced into the upper housing 110a can be discharged by passing through the lower housing 110b.

As the air inlet 111 is formed at the upper housing 110a, and the sub bearing housing 172 is coupled to a lower portion of the lower housing 110b, air introduced through the air inlet 111 can be discharged through the lower portion of the housing 110b.

The rotating shaft 120 can be rotatably inserted through a center of the housing 110 in the axial direction.

Since the impeller 130 is configured to suction air from outside (or external air), it has a structure in which a plurality of blades 132 protrudes from a hub 131 that is located at a central portion thereof.

The hub 131 of the impeller 130 can have a conical shape that gradually increases in diameter from the top to the bottom, and the plurality of blades 132 can protrude in a helical manner from an outer circumferential surface of the hub 131.

The plurality of blades 132 can be disposed to be spaced apart from one another in a circumferential direction of the hub 131. The plurality of blades 132 can be formed such that a gap between each blade increases from an upper end to a lower end of the hub 131.

The plurality of blades 132 and an inner surface of the housing 110 can be spaced apart by a predetermined interval or distance to thereby form a flow path or passage through which air flows.

An impeller coupling portion 123 can be provided at one end portion of the rotating shaft 120, and the impeller 130 can be coupled to the impeller coupling portion 123, allowing the impeller 130 to rotate together with the rotating shaft 120. As the impeller 130 rotates, external air can be introduced into the housing 110.

A first bearing mounting portion 121 to which the first bearing 181 is mounted can be provided at one end of the rotating shaft 120. The first bearing 181 can rotatably support the first bearing mounting portion 121 of the rotating shaft 120.

The second bearing 182 can be coupled to a second bearing mounting portion 124. The second bearing 182 can be configured as a ball bearing. The second bearing 182 can be rotated along the second bearing mounting portion 124 of the rotating shaft 120.

A permanent magnet 143 can be installed between the first bearing mounting portion 121 and the second bearing mounting portion 124 to surround an outer circumferential surface of the rotor 144.

The first bearing mounting portion 121 and the second bearing mounting portion 124 can be respectively disposed at upper and lower portions of the rotating shaft 120 with the permanent magnet 143 interposed therebetween.

The first bearing 181 serves to rotatably support the rotating shaft 120 at one side of the rotating shaft 120. The second bearing 182 is coupled to an end portion of the rotating shaft 120, which is at an opposite side of the first bearing 181, with the rotor 144 interposed between it and the first bearing 181 to thereby rotatably support the rotating shaft 120.

A first O-ring holder 181a can be mounted on an outer circumferential surface of the first bearing 181 to surround the outer circumferential surface of the first bearing 181. The first O-ring holder 181a can have a cylindrical shape.

The first O-ring holder 181a can have a diameter equal or similar to an outer diameter of the first bearing 181. The first bearing 181 can be press-fitted to an inner circumferential surface of the first O-ring holder 181a.

The first bearing 181 can be configured as an air bearing that uses air as a lubricant without the need to use a separate working fluid. Accordingly, even when the rotating shaft 120 rotates at a high speed of 100,000 rpm or higher, wear or abrasion, due to friction between the rotating shaft 120 and the first bearing 181 implemented as the air bearing, may not occur or be reduced, thereby extending the lifespan of the bearing.

In some implementations, unlike the first bearing 181, the second bearing 182 can be configured as a ball bearing. Since the unit cost of a ball bearing is lower than that of an air bearing, using one air bearing and one ball bearing for supporting both sides of the rotating shaft 120 is more advantageous than using two air bearings in terms of costs.

In some examples, where one air bearing 181 and one ball bearing 182 are applied to the fan motor 100, the fan motor 100 may not include a thrust bearing, which may be used in other cases including two air bearings. This can result in achieving size and weight reduction of the fan motor.

The ball bearing can include an outer ring, an inner ring, and a plurality of balls. The outer ring is fixedly installed on an inner circumferential surface of a second O-ring holder 182a, and the inner ring is coupled to an outer circumferential surface of the second bearing mounting portion 124. The plurality of balls is disposed between the outer ring and the inner ring to support rotational motion or movement of the inner ring relative to the outer ring.

The first O-ring holder 181a and the second O-ring holder 182a can be made of a polymer material.

Figure 4A:
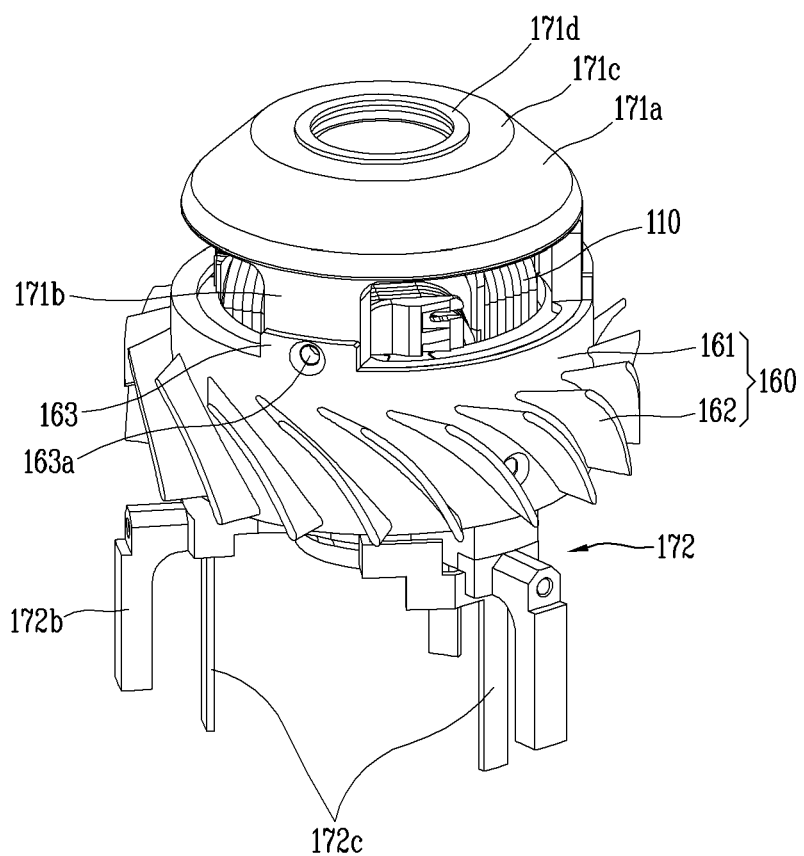
FIG. 4A is a schematic view illustrating the fan motor of FIG. 1 in a state in which a housing is removed.
Figure 4B:
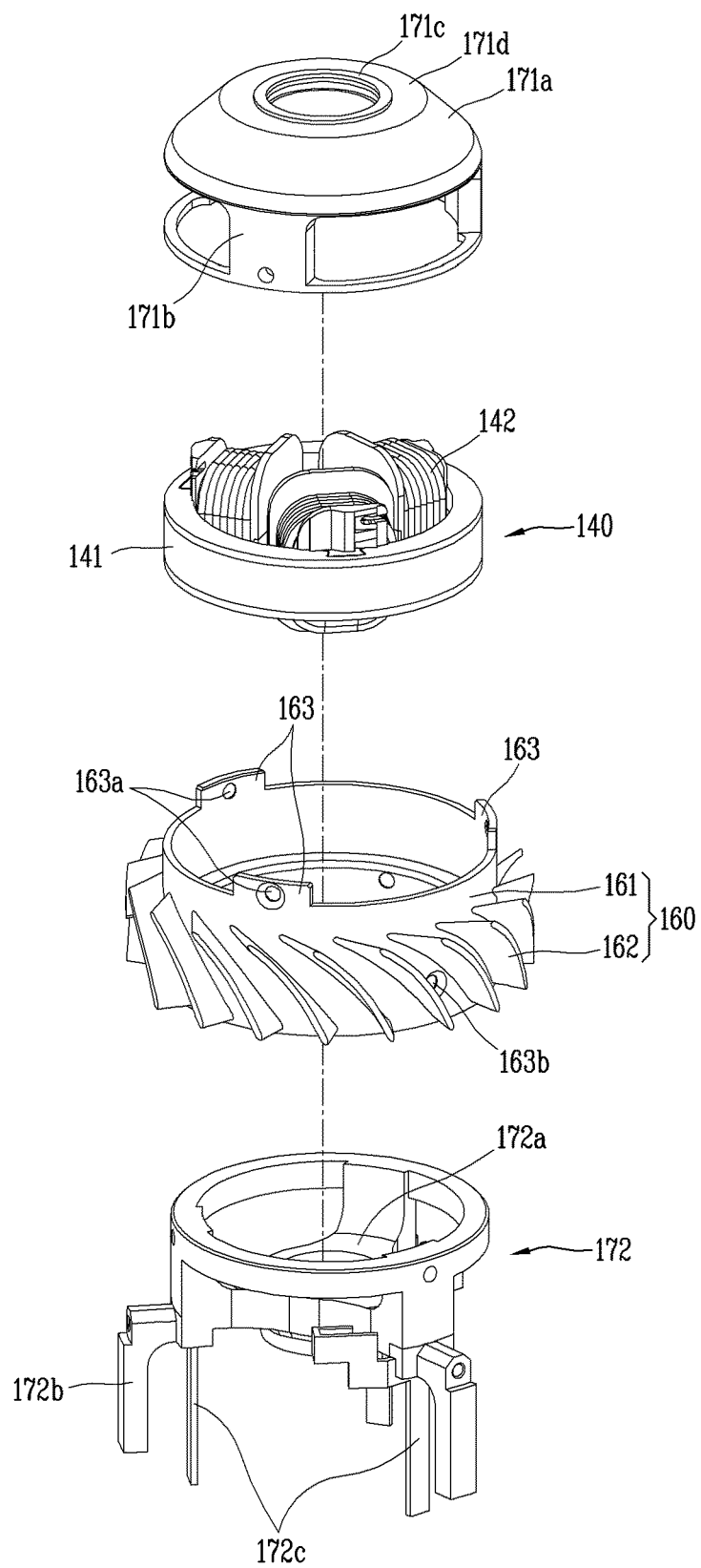
FIG. 4B is an exploded perspective view of FIG. 4A.

FIG. 4A is a schematic view illustrating the fan motor of FIG. 1 in a state in which the housing is removed, and FIG. 4B is an exploded perspective view of FIG. 4A.

As illustrated in FIG. 4A, the bearing housing 171 and the second vane 160 can be coupled to each other by a screw, and the stator 140 can be disposed in an accommodation space defined by the bearing housing 171 and the second vane 160.

The bearing housing 171 can have a cylindrical shape, and serve to accommodate and support the first bearing 181. The bearing housing 171 can be located adjacent to the impeller 130 so as to be fixedly installed inside the housing 110.

The bearing housing 171 can include a body 171a with a cylindrical shape and a plurality of vane coupling portions 171b formed along an outer surface of the body 171a. A plurality of holes can be formed between each vane coupling portion 171b along the outer surface of the body 171a so as to allow air to flow therethrough.

The body 171a can support the first vane 150.

The outer surface of the body 171a can be inclined such that air flows smoothly, allowing an air flow path to be formed between the outer surface of the body 171a and the inner surface of the housing 110.

The body 171a serves to support the first vane 150. In detail, an upper surface of the body 171a can be formed as a constant inclined surface to support a bottom surface of the first vane 150 in a contact manner.

An impeller seating portion 171c formed as a flat surface can be provided at an upper portion of the body 171a so as to allow the impeller 130 to be placed thereon. The impeller seating portion 171c formed on an upper surface of the body 171a can have a constant area in a radial direction.

A first bearing support portion 171d that supports the first bearing 181 can be provided at a central portion or part of the impeller seating portion 171c.

The first bearing support portion 171d can protrude downward so as to allow the first bearing 181 to be placed therein.

As the first bearing support portion 171d has a circular ring shape that protrudes downward, the rotating shaft 120 and the first bearing 181 that surrounds and supports the rotating shaft 120 can be disposed in an accommodation portion formed in the first bearing support portion 171d, causing rotation of the rotating shaft 120.

In detail, as illustrated in FIG. 2, the first bearing support portion 171d has a cylindrical shape that extends downward, allowing the first bearing 181 to be accommodated therein.

Axial and radial movement of the first bearing 181 can be inhibited or limited by the first bearing support portion 171d.

In addition, the impeller 130 can be coupled to an end portion of the rotating shaft 120 that extends upward, cover the first bearing support portion 171d, and be disposed to overlap the bearing housing 171 along the axial direction.

The bearing housing 171 and the impeller 130 can be located adjacent to each other, and the bearing housing 171 can be disposed at a downstream side of the impeller 130 with respect to a flow direction of air generated by the impeller 130. Here, the downstream side refers to a rear side with respect to a flow of air.

Air introduced into the housing 110 as the impeller 130 is driven can be guided by the first vane 150 and flow in a direction toward the bearing housing 171.

The stator 140 can be surrounded and supported by the second vane 160 and be located in the lower housing 110b.

The stator 140 can be disposed at an upper portion of the sub bearing housing 172, and be fixed to the sub bearing housing 172 by a screw.

The stator 140 includes a stator core 141 and a stator coil 142.

The stator core 141 can include a back yoke 141a and a plurality of teeth 141b.

The back yoke 141a can have a ring shape. Each of the plurality of teeth 141b can protrude from an inner surface of the back yoke 141a toward a center thereof.

The plurality of teeth 141b can be configured to be detachable from the back yoke 141a. In this implementation, three teeth 141b can be provided.

A coupling protrusion can protrude from one end portion of each of the plurality of teeth 141b. The coupling protrusion can be coupled to be slidable in the axial direction along a coupling groove formed inside the back yoke 141a.

A pole shoe can protrude from another end portion of each of the plurality of teeth 141b in a circumferential direction. The plurality of teeth 141b can be disposed to be spaced apart from one another in a circumferential direction of the back yoke 141a.

The stator coil 142 can be configured as a three-phase coil. Each phase of the plurality of stator coils 142 can be wound around one of the plurality of teeth 141b in a concentrated winding manner.

This configuration can improve the motor output and contribute to size and weight reduction of the motor.

In addition, an insulator 141c that provides insulation between the stator core 141 and the stator coil 142 can be disposed between the stator core 141 and the stator coil 142. The insulator 141c can surround a part of the tooth 141b or a part of the back yoke 141a. The insulator 141c can be made of an insulating material such as plastics.

The rotor 144 can be rotated by electromagnetic force and include the permanent magnet 143.

The permanent magnet 143 can be mounted to a circumferential surface of a rotor support portion 122. A diameter of the permanent magnet 143 can be less than an inner diameter of the stator core 141.

Here, the inner diameter of the stator core 141 refers to a diameter of a circumference that passes through inner ends of the plurality of pole shoes in the circumferential direction.

In some implementations, the permanent magnet 143 and the rotor support portion 122 can have the same diameter.

The permanent magnet 143 can be rotatably mounted to the rotating shaft 120 to be spaced apart radially inward from the pole shoe of the stator core 141 with an air gap.

In order to limit axial movement of the permanent magnet 143, an end cap can be installed at a lower side of the rotor support portion 122. The end cap can have a cylindrical shape with the same diameter as the permanent magnet 143.

As one side of the permanent magnet 143 is in contact with a portion that is larger in diameter than the rotor support portion 122, upward axial movement thereof can be inhibited. Also, as described above, another side of the permanent magnet 143 can be inhibited from moving downward along the axial direction by the end cap.

When three-phase alternating current is applied to each of the plurality of stator coils 142, the permanent magnet 143 can generate a rotational force through electromagnetic interaction with a magnetic field produced around the stator coil 142.

Accordingly, the rotating shaft 120 can be rotated by electromagnetic interaction between the rotor 144 and the stator 140.

The first vane 150 is installed to be adjacent to the impeller 130 and serves to guide a flow of air generated by the impeller 130.

The first vane 150 can be inserted toward an upper portion of the bearing housing 171, and be disposed at the downstream side of the impeller 130 so as to guide a flow of air moving to the inner surface of the housing 110 by the impeller 130.

The first vane 150 can include a first vane hub 151 having a cylindrical shape and installed to be adjacent to the impeller 130 and a vane blade 152 formed along an outer surface of the first vane hub 151 having the cylindrical shape.

The first vane hub 151 can be placed on the body 171a of the bearing housing 171 and be fixed by a screw.

The vane blade 152 can protrude along a helical direction and be provided in plurality, for example. The plurality of vane blades 152 can be disposed to be spaced apart from one another along a circumferential direction of the first vane hub 151.

The first vane hub 151 and the vane blade 152 can be made of a metal material, and be integrally formed of a plastic material having an insulating property.

As described above, the fan motor 100 according to the present disclosure includes the second vane 160. The second vane 160 can be installed at a downstream side of the first vane 150 with respect to a flow direction of air generated by the impeller 130. The second vane 160 can be coupled to one side of the stator 140, and be installed to be in contact with the inner surface of the housing 110. A more detailed description of the second vane 160 will be described later.

The sub bearing housing 172 is configured to fix the stator 140.

A second bearing support portion 172a can be provided at an inner central part of the sub bearing housing 172 so that the second bearing 182 is accommodated therein.

The sub bearing housing 172 can be coupled to the lower housing 110b and be disposed at a downstream side of the second vane 160 with respect to a flow direction of air.

The sub bearing housing 172 can be provided with the second bearing support portion 172a in which the second bearing 182 is accommodated. The second bearing support portion 172a can be formed at a central part of the sub bearing housing 172 in a recessed manner, and have a shape that protrudes upward so as to allow the second bearing 182 to be accommodated therein. The second bearing 182 can be configured as a ball bearing.

In the sub bearing housing 172, a plurality of air outlets 172e can be formed at a position adjacent to the second bearing support portion 172a, allowing air to be discharged to the outside.

Figure 5:
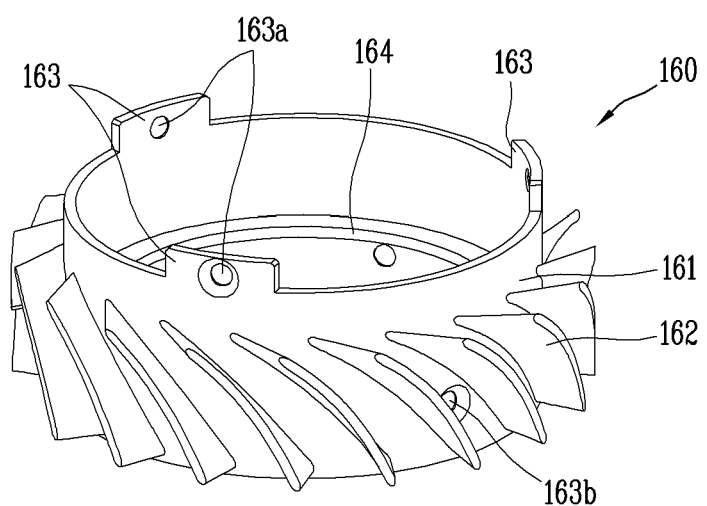
FIG. 5 is a perspective view illustrating an example of a second vane.
Figure 6A:
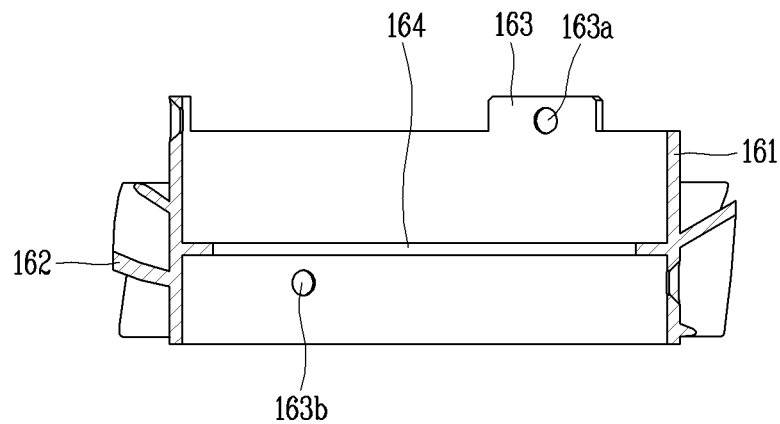
FIG. 6A and FIG. 6B are a longitudinal cross-sectional view and a horizontal cross-sectional view of the second vane, respectively.
Figure 6B:
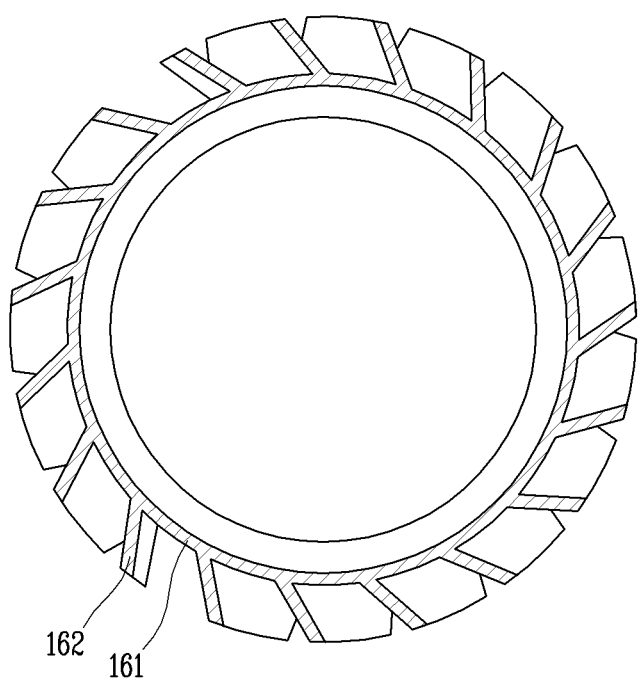
Figure 7:
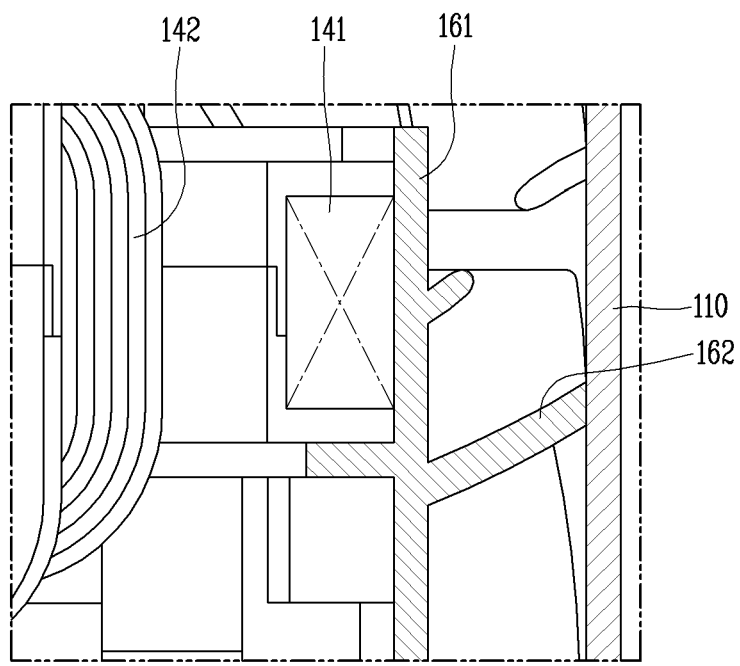
FIG. 7 is an enlarged view illustrating an example of an inside of the fan motor.

FIG. 5 is a perspective view of the second vane 160, FIG. 6A is a longitudinal cross-sectional view of the second vane 160 and FIG. 6B is a horizontal cross-sectional view of the second vane 160, and FIG. 7 is a partially enlarged view illustrating an inside of the fan motor 100.

The second vane 160, which is located at the downstream side of the first vane 150, can be disposed to be axially spaced apart from the first vane 150 on a straight line.

The second vane 160 can include a second vane hub 161 and a heat dissipation fin (or cooling fin) 162.

The second vane hub 161 and the heat dissipation fin 162 can be integrally formed, and be made of the same metal material. For example, the second vane hub 161 and the heat dissipation fin 162 can be made of an aluminum material and an aluminum alloy having excellent thermal conductivity.

The second vane hub 161 can have a cylindrical shape and be installed to surround and support the stator 140. A cooling flow path can be formed between the second vane hub 161 and the inner surface of the housing 110, so as to allow air to flow therethrough. The cooling flow path can be formed in a straight line along the axial direction to minimize flow resistance.

The second vane 160 can include a plurality of heat dissipation fins 162 protruding outward from an outer surface of the second vane hub 161. Here, each of the heat dissipation fins 162 can protrude from the outer surface of the second vane hub 161, so as to be accommodated in the cooling flow path.

Each of the heat dissipation fins 162 can protrude from an outer circumferential surface of the second vane hub 161 along a helical direction, and at least a part (or some) of the heat dissipation fins 162 can be in contact with the inner surface of the housing 110, allowing heat to be transferred to the housing 110.

Each of the heat dissipation fins 162 can be radially disposed at predetermined intervals along the outer surface of the second vane hub 161. Here, each of the heat dissipation fins 162 can be inclined at a predetermined angle along the outer surface of the second vane hub 161.

The heat dissipation fin 162 has a thin plate shape and serves to guide air suctioned by the impeller 130 to pass through the first vane 150 and flow toward the sub bearing housing 172.

A process of heat dissipation by the second vane 160 will be described. As the second vane hub 161 of the second vane 160 is installed to be in contact with the stator 140, heat generated during the operation of the fan motor can be transferred thereto. Since the plurality of heat dissipation fins 162 formed along the outer surface of the second vane hub 161 is disposed in the cooling flow path, heat can be released into the cooling flow path through which air flows.

In addition, as the plurality of heat dissipation fins 162 protrudes from the outer circumferential surface of the second vane hub 161 in the helical direction, and at least a part of the heat dissipation fins 162 is in contact with the inner surface of the housing 110, heat can be transferred to the housing 110 by conduction.

For example, when current is applied to the stator coil 142, heat is generated in the stator coil 142. The heat is conducted through the stator core 141 and is then transferred to the second vane hub 161 of the second vane 160.

As the plurality of heat dissipation fins 162 provided at the second vane hub 161 serves to increase a heat exchange area with air and comes in contact with the inner surface of the housing 110, namely, an inner surface of the lower housing 110b, heat can be transferred to the housing 110 by conduction. This can allow a heat dissipation area to be increased to thereby improve motor cooling performance. Application of this structure can enable a temperature of the motor to be reduced by as much as 20 to 30° C.

As described above, the heat dissipation fin 162 can serve to increase the cooling performance and to guide air moved by the impeller 130 to flow downward.

That is, in the fan motor 100 according to the present disclosure, the plurality of heat dissipation fins 162 can allow air to be smoothly transferred to the sub bearing housing 172. In addition, as at least a part of the heat dissipation fins 162 is in contact with the inner surface of the housing 110, heat transfer can be performed smoothly.

The second vane 160 can be provided with a seating portion 163 protruding upward from an upper end of the second vane hub 161, so as to be coupled to the bearing housing 171. The seating portion 163 can protrude upward in the axial direction from the upper end of the second vane hub 161.

The seating portion 163 can be provided at a plurality of locations or places along the upper end of the second vane hub 161. For example, the seating portion 163 can be provided at three locations, as depicted in FIG. 5, and the seating portions 163 can be disposed to be 120 degrees apart from one another.

The seating portions 163 can each include a coupling hole 163a to be fixed to the respective second vane coupling portions 171b provided at the bearing housing 171 by screw fastening.

The seating portion 163 can be disposed to overlap the second vane coupling portion 171b of the bearing housing 171, so as to be fixed to the coupling hole 163a by a fastening member.

As the fastening member such as a screw is fastened by passing through the vane coupling portion 171b of the bearing housing 171 and the seating portion 163 of the second vane 160, the bearing housing 171 disposed along the axial direction and the second vane hub 161 can be firmly coupled to each other. Further, this simple and compact coupling structure can contribute to size and weight reduction of the motor.

A protruding portion 164 can radially protrude from an inner surface of the second vane hub 161 of the second vane 160, so as to support the stator 140 having at least a part thereof inserted toward an upper portion of the second vane 160 and the sub bearing housing 172 having at least a part thereof inserted toward a lower portion of the second vane 160.

Hereinafter, a path of an air flow generated as the impeller 130 is driven will be described.

Air is suctioned into the housing 110 through the air inlet 111 as the impeller 130 is driven, and the air travels toward the first vane 150 through a space between the impeller 130 and the inner surface of the housing 110.

Then, the air flows along a space formed between the first vane 150 and the inner surface of the housing 110 and a cooling flow path formed between the second vane 160 and the inner surface of the housing 110, and is then discharged to the outside through the air outlet 172e.

Here, the air flowing along the cooling flow path exchanges heat with the second vane hub 161 and the heat dissipation fins 162 of the second vane 160, allowing heat of the stator 140 to be cooled in a more effective manner.

That is, the heat dissipation fins 162 can serve to guide the flow of air moving inside the housing 110 and to maximize the cooling performance of the motor by expanding the heat exchange area between the air and the stator 140.

In some implementations, as air moved by the blades 132 of the impeller 130 flows along a streamlined outer surface overlapped by the bearing housing 171 and the first vane 150, there is no sudden or drastic change in the flow path of air, creating a flow of air while minimizing flow resistance. This can allow the flow path efficiency to be increased.

In some implementations, even when the rotating shaft 120 rotates at a high speed of 100,000 rpm or higher, both ends of the rotating shaft 120 can be supported by the first bearing 181 and the second bearing 182 to thereby suppress impact from being applied to the bearing. This can result in preventing a decrease in the lifespan of the bearing.

The foregoing implementations are merely given of those implementations for practicing a fan motor according to the present disclosure. Therefore, the present disclosure is not limited to the above-described implementations, and it will be understood by those of ordinary skill in the art that various changes in form and details can be made therein without departing from the scope of the present disclosure.

What is claimed is:

1. A fan motor, comprising:
a housing;
a rotating shaft that is rotatably disposed in the housing and extends through the housing;
an impeller rotatably disposed at the rotating shaft;
a first vane disposed adjacent to the impeller and configured to guide a flow of air generated by the impeller;
a rotor disposed at the rotating shaft and spaced apart from the impeller in an axial direction of the rotating shaft;
a stator that is disposed in the housing and surrounds the rotor, the stator and the rotor defining an air gap therebetween;
a second vane coupled to the stator and disposed downstream relative to the first vane in a flow direction of the flow of air, the second vane being in contact with at least a part of an inner surface of the housing;
a first bearing that is disposed at a first side of the rotating shaft with respect to the rotor and rotatably supports the rotating shaft;
a second bearing that is disposed at a second side of the rotating shaft with respect to the rotor and rotatably supports the rotating shaft; and
a first bearing housing that accommodates and supports the first bearing, that is disposed adjacent to the impeller, and that is fixed inside the housing,
wherein the first bearing housing comprises:
a body having a cylindrical shape,
a plurality of vane coupling portions that are disposed along an outer circumferential surface of the body, and
a plurality of holes arranged circumferentially along the outer circumferential surface of the body between the plurality of vane coupling portions;
wherein the second vane comprises a seating portion that protrudes toward the impeller and is coupled to the first bearing housing, the seating portion defining a coupling hole that receives a screw fixing the second vane to one of the plurality of vane coupling portions.

2. The fan motor of claim 1, wherein the first vane comprises a first vane hub that has a cylindrical shape and a vane blade that extends along an outer surface of the first vane hub.

3. The fan motor of claim 2, wherein the vane blade is one of a plurality of vane blades that extend along the outer surface of the first vane hub and are spaced apart from one another in a circumferential direction of the first vane hub.

4. The fan motor of claim 2, wherein the second vane comprises:
a second vane hub that has a cylindrical shape and surrounds the stator; and
a heat dissipation fin that protrudes from an outer surface of the second vane hub and is in contact with the inner surface of the housing, the heat dissipation fin being configured to transfer heat to the inner surface of the housing.

5. The fan motor of claim 4, wherein the heat dissipation fin is configured to guide the flow of air away from the impeller.

6. The fan motor of claim 5, wherein the heat dissipation fin is one of a plurality of heat dissipation fins that protrude from the outer surface of the second vane hub, and
wherein each of the plurality of heat dissipation fins is inclined with respect to the axial direction at a predetermined angle such that air is introduced into the housing toward the impeller based on the impeller being driven.

7. The fan motor of claim 6, wherein the plurality of heat dissipation fins extend along the outer surface of the second vane hub and are spaced apart from one another by a predetermined interval in a circumferential direction of the second vane hub.

8. The fan motor of claim 1, wherein the seating portion is one of a plurality of seating portions that are arranged along an upper end of the second vane.

9. The fan motor of claim 1, wherein the first bearing housing is disposed downstream relative to the impeller in the flow direction.

10. The fan motor of claim 1, wherein the impeller is configured to be driven to introduce air into the housing toward the second vane.

11. The fan motor of claim 1, wherein the body supports a bottom portion of the first vane, and
wherein the body comprises an impeller seating portion disposed at an upper portion thereof.

12. The fan motor of claim 1, wherein the body comprises a bearing support portion that is disposed at a central portion thereof and has a ring shape, the bearing support portion extending in the axial direction and accommodating the first bearing.

13. The fan motor of claim 1, wherein the plurality of holes are configured to communicate air therethrough.

14. The fan motor of claim 1, further comprising a sub bearing housing coupled to a lower portion of the housing and disposed downstream relative to the second vane in the flow direction, and
wherein the sub bearing housing comprises a sub bearing support portion disposed at a central portion thereof, the sub bearing support portion extending parallel to the axial direction and accommodating the second bearing.

15. The fan motor of claim 14, wherein the sub bearing housing defines a plurality of air outlets disposed adjacent to the sub bearing support portion and configured to discharge air to an outside of the fan motor.

16. The fan motor of claim 14, wherein the stator is disposed at an upper portion of the sub bearing housing and is fixed to the sub bearing housing by a screw.

17. The fan motor of claim 1, wherein the plurality of vane coupling portions extend parallel to the axial direction, and
wherein the plurality of holes pass through the outer circumferential surface of the body in a radial direction of the body.

* * * * *